United States Patent [19]

Crano et al.

[11] Patent Number: 5,017,666

[45] Date of Patent: May 21, 1991

[54] POLYOL(ALLYL CARBONATE) COMPOSITIONS AND POLYMERIZATES PREPARED THEREFROM

[75] Inventors: John C. Crano, Akron; Ronald L. Haynes, Barberton, both of Ohio

[73] Assignee: PPG Industries, Inc., Pittsburgh, Pa.

[21] Appl. No.: 163,227

[22] Filed: Feb. 26, 1988

Related U.S. Application Data

[63] Continuation of Ser. No. 690,411, Jan. 10, 1985, abandoned, which is a continuation of Ser. No. 549,850, Nov. 9, 1983, abandoned.

[51] Int. Cl.$^5$ .................. C08F 4/32; C08F 18/24
[52] U.S. Cl. .................. 526/230.5; 528/501; 526/314
[58] Field of Search .............. 528/501; 526/314, 230.5

[56] References Cited

U.S. PATENT DOCUMENTS

| | | | |
|---|---|---|---|
| 2,370,565 | 2/1945 | Muskat et al. | 260/78 |
| 2,370,567 | 2/1945 | Muskat et al. | 260/463 |
| 2,385,933 | 10/1945 | Muskat et al. | 526/314 |
| 2,403,113 | 7/1946 | Muskat et al. | 526/314 |
| 2,403,113 | 7/1946 | Muskat et al. | 260/78 |
| 2,407,446 | 9/1946 | Pollack | 260/78 |
| 2,464,056 | 3/1949 | Pechukas | 260/463 |
| 2,587,437 | 2/1952 | Bralley et al. | 260/77.5 |
| 3,385,836 | 5/1968 | Mednick et al. | 528/501 |
| 3,751,374 | 8/1973 | Berry et al. | 526/314 |
| 4,083,819 | 4/1978 | Hisano et al. | 526/322 |
| 4,139,578 | 2/1979 | Baughman et al. | 260/871 |
| 4,311,762 | 1/1982 | Spycher et al. | 428/412 |
| 4,346,197 | 8/1982 | Crano et al. | 525/277 |
| 4,398,008 | 7/1983 | Misura | 526/314 |
| 4,408,016 | 10/1983 | Eads et al. | 525/277 |
| 4,590,248 | 5/1986 | Moriya et al. | 526/286 |
| 4,613,656 | 9/1986 | Tang | 526/230.5 |
| 4,622,376 | 11/1986 | Misura et al. | 526/286 |
| 4,686,266 | 8/1987 | Tang | 526/230.5 |

FOREIGN PATENT DOCUMENTS

| | | |
|---|---|---|
| 0130838 | 1/1985 | European Pat. Off. . |
| 51-9188 | 1/1976 | Japan ................. 526/314 |
| 57-133106 | 8/1982 | Japan ................. 526/314 |
| 61-64706 | 4/1986 | Japan . |
| 793481 | 4/1958 | United Kingdom . |

OTHER PUBLICATIONS

Abstract of JP 61[1986]-64706.
Isaoka et al., *Journal of Polymer Science*, Part A-1, vol. 8 (1970).
Chemical Abstracts, 63: 1649c.
Chemical Abstracts, 105: 191807n.

*Primary Examiner*—Thurman K. Page
*Assistant Examiner*—Peter F. Kulkosky
*Attorney, Agent, or Firm*—George D. Morris

[57] ABSTRACT

Polyol (allyl carbonate), e.g., diethylene glycol bis(allyl carbonate), are polymerized in solution, i.e., in an organic solvent, until from about 20 to 50 percent of the allylic carbon-carbon linkages are consumed. The solvent is then removed yielding a product that is a gel-free, syrupy viscous liquid of unpolymerized monomer and polymer. This liquid polymer can be polymerized to a hard, transparent material with less shrinkage. Also described is the addition of mono- or polyfunctional acrylates to the liquid polymer to product a polymerizable mixture that can be cured quickly with the addition of a free-radical initiator.

12 Claims, No Drawings

POLYOL(ALLYL CARBONATE) COMPOSITIONS AND POLYMERIZATES PREPARED THEREFROM

This application is a continuation of application Ser. No. 690,411, filed Jan. 10, 1985, now abandoned, which is a continuation of application Ser. No. 549,850, filed Nov. 9, 1983, now abandoned.

DESCRIPTION OF THE INVENTION

Polyol(allyl carbonate) monomers are polymerized by free radical initiators to yield hard polymers. Many of these monomers yield rigid polymers that are essentially transparent to visible light, are substantially colorless, have indices of optical refraction of from about 1.45 to about 1.55, and possess a Barcol hardness above about 20. For these reasons, such monomers find utility as a precursor for transparent coatings, optical lenses and other optical elements, and flat or curved transparent sheets.

One problem associated with the free radical initiated polymerization of polyol(allyl carbonate) monomers is the lengthy polymerization (cure) time required to obtain a full cure, e.g., on the order of 12 to 24 hours for the diisopropyl peroxydicarbonate initiated homopolymerization of diethylene glycol bis(allyl carbonate) monomer. Another problem associated with the polymerization of polyol(allyl carbonate) monomers is the relative high shrinkage of the material which occurs during the course of polymerization, e.g., there is approximately 12.5 percent shrinkage during the homopolymerization of diethylene glycol bis(allyl carbonate).

U.S. Pat. No. 4,346,197 describes compositions of bis(allyl carbonate) monomer and a high molecular weight unsaturated polymer, e.g., an acrylate polymer, which compositions exhibit reduced shrinkage. U.S. Pat. No. 4,408,016 describes three component compositions comprising the bis(allyl carbonate) blends of U.S. Pat. No. 4,346,197 and a multi-functional acrylate monomer. These three component blends are characterized by shorter initial cure times and polymerizates of reduced haze. U.S. Pat. No. 4,139,578 describes compositions of a bis(allyl carbonate) monomer, an ethylenically unsaturated polyester and an ester of an unsaturated dicarboxylic acid. These compositions exhibit reduced shrinkage during polymerization.

It has now surprisingly been found that a polyol(allyl carbonate) monomer can be partially polymerized in solution, i.e., the monomer is dissolved in an organic solvent in which the monomer and the resulting polymer are soluble, and the monomer polymerized until 20 to 50 percent allylic utilization, i.e., until 20 to 50 percent of the unsaturated (allylic) carbon—carbon linkages are consumed. The liquid polymer product separated from the solvent is a syrupy, substantially gel-free, pourable, viscous liquid of unpolymerized monomer and polymer. The degree of allylic utilization can be determined by nuclear magnetic resonance (NMR) or infrared (IR) spectroscopy. As used herein, the term "liquid polymer" is meant to refer to the above-described composition that is separated from the solvent. The liquid polymer will polymerize to a hard, transparent material in about 2 to 18 hours with from about 6 to 10 percent shrinkage. The actual amount of shrinkage will depend upon the extent of allylic utilization.

The partial polymerization, i.e., from 20 to 50 percent allylic utilization, of polyol(allyl carbonate) in the absence of a solvent results in the formation of a product that is an insoluble, intractable gel. Such insoluble gel typically forms at about twelve percent allylic utilization. In contrast, the pourable, syrupy liquid composition produced by the above-described partial solution polymerization of polyol (allyl carbonate) monomer is substantially gel-free. By substantially gel-free is meant that the liquid polymer has less than 5 percent by weight, basis the original monomer, of gel, more usually less than 2 percent gel. Most often no gel can be found in the liquid polymer.

It has now further surprisingly been found that the initial cure times for the liquid polymer described herein can be reduced by incorporating therein unsaturated cure enhancing compatible components. Such liquid polymerizable compositions, i.e., a modified liquid polymer, can be cured to a hard, transparent material in less than about 2 hours and with from about 6 to 10 percent shrinkage.

As used herein, the term "shrinkage" is meant the quotient of (hard polymer density minus liquid polymer or modified liquid polymer density) divided by hard polymer density. Expressed mathematically, $$\text{Shrinkage} = \frac{D_p - D_m}{D_p}$$

wherein $D_p$ is the density of the hard polymer (polymerizate) and $D_m$ is the density of the liquid polymer or modified liquid polymer. For example, shrinkage during the homopolymerization of diethylene glycol bis(allyl carbonate) monomer is about 12.5 percent. In contrast, the shrinkage of a liquid polymer of diethylene glycol bis(allyl carbonate) having approximately 15 to 50 percent allylic utilization is from 10 to about 6 percent respectively.

Suitable unsaturated cure enhancing materials include mono- or polyfunctional acrylates, which are dispersed or dissolved in the liquid polymer. More than one cure enhancing material can be used to reduce the time required to cure the liquid polymer. In addition, a further different mono-unsaturated monomer can be added to the liquid polymer. The total amount of mono- and polyfunctional acrylate compounds and further mono-unsaturated monomer added to the liquid polymer can vary, but will commonly range from about 5 to about 30 weight percent, preferably 5 to 20 weight percent, basis the weight of the liquid polymer. The relative amounts of each additive incorporated into the liquid polymer (when more than one additive is used) can vary and will depend on the effect desired, e.g., the degree of cure enhancement and/or the extent of dilution of liquid polymer by the mono-unsaturated monomer desired.

The liquid polymer or enhanced cure liquid polymerizable compositions containing liquid polymer (hereinafter "modified liquid polymer") can be utilized in any application which requires a quick curing material and a polymer having an index of refraction of about 1.49 or greater, a shrinkage of 10 percent or less, and/or a relatively low exothermic heat of polymerization. For example, the liquid polymer or modified liquid polymer can be cured quickly while in contact with a suitable substrate, e.g., substrates used in the optical recording media, whereby to form an adherent, solid coating. The substrate can be a recording medium as a selenium, tellurium, gold, or aluminum film, one surface of which is in contact with the hard polymer. While the cured polymer layer has been referred to herein as a coating, it can also be the substrate, i.e., with the recording medium or subbing layer, or recording medium and subbing layer applied thereto. The liquid polymer or modified liquid polymer can also be used to form polymeric filamentary articles, especially a clad polymeric filamentary article, e.g., a fiber optic. The liquid polymer or modified liquid polymer can be cured in a mold to yield an optical element, such as a lens or lens blank.

DETAILED DESCRIPTION OF THE INVENTION

This invention relates to a method of solution polymerizing polyol(allyl carbonate) monomers to viscous liquid polymer compositions, to the method of polymerizing the viscous liquid polymer compositions and modified liquid polymer compositions, and to the rigid hard polymerizates and articles prepared thereby.

In accordance with a method of the present invention, polyol(allyl carbonate) monomer is dissolved in a solvent in which the polymer produced from such monomer is also soluble. Preferably, the initiator used to conduct the polymerization is also soluble in the solvent. The resulting liquid solution comprising polyol(allyl carbonate) monomer, solvent and preferably initiator is then partially polymerized, e.g., by heating the liquid solution to polymerization temperatures. The polymerization reaction is allowed to continue until from 20 to 50 percent allylic utilization is attained, i.e., until from 20 to 50 percent of the unsaturated carbon—carbon linkages in the monomer are consumed. The degree of allylic utilization can be controlled by regulating the amount of initiator added to the liquid solution, the temperature at which the partial polymerization is performed, and the ratio of solvent to polyol(allyl carbonate). Generally, the greater the amount of initiator used, the higher is the allylic utilization. The higher the temperature of polymerization, the lower is the degree of allylic utilization.

In a preferred embodiment, from about 0.1 to about 1.5 weight percent of initiator, basis the amount of monomer, from about 0.5 to 5 milliliters of solvent per gram of monomer, and polymerization temperatures of from 28° C. to about 100° C. are used. The degree of allylic utilization can be monitored by nuclear magnetic resonance (NMR) and infrared (IR) spectroscopy. The solvent in the resulting composition can be removed by known techniques, e.g., by evaporation or distillation, leaving a viscous liquid comprising a solution of partially polymerized polyol(allyl carbonate) in polyol(allyl carbonate) monomer. This liquid product is for convenience, referred to herein as "liquid polymer".

The liquid polymer is typically a pourable, syrupy liquid having a kinematic viscosity (measured with a capillary viscometer) of from at least about 100 centistokes to about 100,000 centistokes, typically from about 1000 to 40,000 centistokes, more typically from about 1,000 to 2,000 centistokes, measured at 25° C., and a bulk density at 25° C. of from about 1.17 to about 1.23 grams per cubic centimeter. The liquid polymer is further characterized by having from about 20 to 50 percent allylic utilization, as determined by IR or NMR analysis. IR analysis is preferred. The liquid polymer can be polymerized to a hard product without further additives other than an initiator, i.e., it can be directly cast, molded or the like with only the addition of initiator.

Alternatively, various cure enhancing additives can be added to the liquid polymer. Typically the cure enhancing additives are mono- or polyfunctional compatible unsaturated acrylate monomers. The cure enhancing additive can be a monofunctional acrylate monomer, a polyfunctional acrylate monomer or mixtures of such monomers. It is also contemplated that more than one mono- or polyfunctional acrylate monomer can be added to the liquid polymer as the cure enhancing additive. Additionally, a further different mono-unsaturated monomer can be added to the cure enhanced liquid polymer. In this way there is provided a modified liquid polymer composition comprising liquid polymer and mono- and/or polyfunctional acrylate monomer, or liquid polymer and mono- and/or polyfunctional acrylate monomer and a further different mono-unsaturated monomer. The resulting polymerizable liquid composition can be polymerized to yield a solid rigid, hard polymerizate.

Various polymerization methods can be used to effect the polymerization of liquid polymer-containing compositions. For example, the compositions can be polymerized in glass molds, whereby to form optical lenses or lens blanks. Alternatively, the liquid polymer can be used in laminating, or thickened for lamination or extrusion. According to one particularly preferred exemplification, a film of a modified liquid polymer composition is provided on a surface to be coated. The liquid polymer film is then cured to form an adherent, hard solid coating on the surface. The coated surface can be an optical recording medium, e.g., a selenium, tellurium, gold or aluminum film, one surface of which is in contact with the hard polymer coating prepared as described above. The coating can be a film, e.g., from about 0.1 millimeter to about 5 millimeters thick. Alternatively, the hard polymer can be the substrate, e.g., from about 1 millimeter to about 10 millimeters thick, with the recording or subbing medium, or recording and subbing medium applied thereto.

According to a further exemplification of this invention, filaments, i.e., individual continuous strands, can be prepared by extrusion of a thickened modified liquid polymer composition. The extrusion is typically through a die, e.g., a spinneret, with the polymerization being carried out during extrusion. In a particularly preferred embodiment, the thickened modified liquid polymer composition is in contact with and within a polymeric, thermoplastic conduit or tube. In the manufacturing process the conduit or tube is drawn and thereby reduced to an outside diameter of about 0.001 inch to about 0.070 inch, preferably from 0.002 inch to 0.060 inch, with a wall thickness of about 0.0004 inch to about 0.005 inch. The modified liquid polymer polymerizate forms within and adheres to the conduit or tube as a solid core.

It is especially preferred that the conduit or tube which serves as the cladding of the liquid polymer polymerizate has a lower optical index of refraction than the polymerizate of the liquid polymer. Suitable cladding materials include: halocarbons, especially fluorocarbons. Particularly preferred fluorocarbons include poly(vinyl fluoride), fluorinated acrylates, copolymers of perfluoropropylene and tetrafluoroethylene, copolymers of perfluoropropylene and vinylidene fluoride, chlorotrifluoroethylene, copolymers of vinylidene fluoride with chlorotrifluoroethylene, and copolymers of vinyl fluoride, vinylidene fluoride, and chlorotrifluoroethylene with ethylene.

Polyol (allyl carbonate) monomers which can be utilized in the practice of the present invention, to form the liquid polymer and modified liquid polymer compositions are the allyl carbonates of linear or branched aliphatic or aromatic liquid polyols, e.g., aliphatic glycol bis(allyl carbonate) compounds, or alkylidene bisphenol bis(allyl carbonate) compounds. These monomers can be described as unsaturated polycarbonates of polyols, e.g., glycols. The monomers can be prepared by procedures well known in the art, e.g., U.S. Pat. Nos. 2,370,567 and 2,403,113. In the latter patent, the monomers are prepared by treating the polyol, e.g., glycol with phosgene at temperatures between 0° C. and 20° C. to form the corresponding polychloroformate, e.g., dichloroformate. The polychloroformate is then reacted with an unsaturated alcohol in the presence of a suitable acid accepter, e.g., pyridine, a tertiary amine, or an alkaline or alkaline earth metal hydroxide. Alternatively, the unsaturated alcohol can be reacted with phosgene and the resulting chloroformate reacted with the polyol in the presence of an alkaline reagent, as described in U.S. Pat. No. 2,370,567.

The polyol (allyl carbonate) monomers can be represented by the graphic formula:

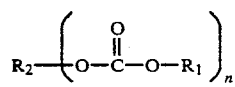

wherein $R_1$ is the radical derived from the unsaturated alcohol and is an allyl or substituted allyl group, $R_2$ is the radical derived from the polyol and n is a whole number from 2-5, preferably 2. The allyl group ($R_1$) can be substituted at the 2 position with a halogen, most notably chlorine or bromine, or an alkyl group containing from 1 to 4 carbon atoms, generally a methyl or ethyl group. The $R_1$ radical can be represented by the graphic formula:

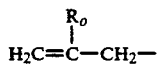

wherein $R_0$ is hydrogen, halogen, or a $C_1$–$C_4$ alkyl group. Specific examples of $R_1$ include the groups: allyl, 2-chloroallyl, 2-bromoallyl, 2-fluoroallyl, 2-methallyl, 2-ethylallyl, 2-isopropylallyl, 2-n-propylallyl, and 2-n-butylallyl. Most commonly, $R_1$ is the allyl group, $H_2C=CH-CH_2-$.

$R_2$ is a polyvalent radical derived from the polyol, which can be an aliphatic or aromatic polyol that contains 2, 3, 4 or 5 hydroxy groups. Typically, the polyol contains 2 hydroxy groups, i.e., a glycol or bisphenol. The aliphatic polyol can be linear or branched and contain from 2 to 10 carbon atoms. Commonly, the aliphatic polyol is an alkylene glycol having from 2 to 4 carbon atoms or a poly($C_2$–$C_4$) alkylene glycol, i.e., ethylene glycol, propylene glycol, trimethylene glycol, tetramethylene glycol, or diethylene glycol, triethylene glycol, etc.

The aromatic polyol can be represented by the graphic formula:

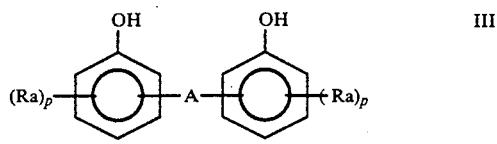

wherein A is a divalent alkyl radical, e.g., an alkylidene radical, having from 1 to 4 carbon atoms, e.g., methylene, ethylidene, dimethylmethylene (isopropylidene), Ra represents lower alkyl substituents of from 1 to 3 carbon atoms, and p is 0, 1, 2, or 3. Preferably, the hydroxyl group is in the ortho or para position.

Specific examples of the radical $R_2$ include: alkylene groups containing from 2 to 10 carbon atoms such as ethylene, ($-CH_2-CH_2-$), trimethylene, methylethylene, tetramethylene, ethylethylene, pentamethylene, hexamethylene, 2-methylhexamethylene, octamethylene, and decamethylene; alkylene ether groups such as $-CH_2-O-CH_2-$, $-CH_2CH_2-O-CH_2CH_2-$, $-CH_2-O-CH_2-CH_2-$, and $-CH_2CH_2CH_2-O-CH_2CH_2CH_2-$; alkylene polyether groups such as $-CH_2CH_2-O-CH_2CH_2-O-CH_2CH_2-$ and $-CH_2CH_2CH_2-O-CH_2CH_2CH_2-O-CH_2CH_2CH_2-$ alkylene carbonate and alkylene ether carbonate groups such as $-CH_2CH_2-O-CO-O-CH_2CH_2-$ and $-CH_2CH_2-O-CH_2CH_2-O-CO-O-CH_2CH-O-CH_2CH_2-$; and isopropylidene bis(para-phenyl)

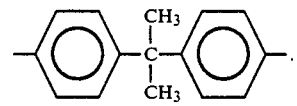

Most commonly, $R_2$ is $-CH_2CH_2-$, $-CH_2CH_2-O-CH_2CH_2-$, or $-CH_2CH_2-O-CH_2CH_2-O-CH_2CH_2-$.

Specific examples of polyol (allyl carbonate) monomers useful in the practice of the invention herein contemplated include ethylene glycol bis(2-chloroallyl carbonate), ethylene glycol bis(allyl carbonate), diethylene glycol bis(2-methallyl carbonate), diethylene glycol bis(allyl carbonate), triethylene glycol bis(allyl carbonate), propylene glycol bis(2-ethylallyl carbonate), 1,3-propanediol bis(allyl carbonate), 1,3-butanediol bis(allyl carbonate), 1,4-butanediol bis(2-bromoallyl carbonate), dipropylene glycol bis(allyl carbonate), trimethylene glycol bis(2-ethylallyl carbonate), pentamethylene glycol bis(allyl carbonate), and isopropylidene bisphenol bis(allyl carbonate).

Industrially important polyol bis(allyl carbonate) monomers which can be utilized in the invention herein contemplated are:

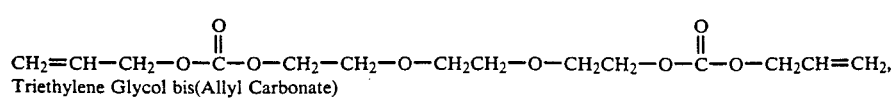
Triethylene Glycol bis(Allyl Carbonate)

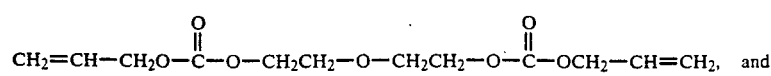

Diethylene Glycol bis(Allyl Carbonate)

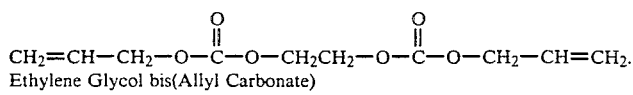
Ethylene Glycol bis(Allyl Carbonate)

Diethylene glycol bis(allyl carbonate) is preferred. This monomer is commercially available from PPG Industries, Inc. and is sold under the trademark CR-39 Allyl Diglycol Carbonate.

Because of the process by which the polyol(allyl carbonate) monomer is prepared, i.e., by phosgenation of the polyol (or allyl alcohol) and subsequent esterification by the allyl alcohol (or polyol), the monomer product can contain related monomer species in which the moiety connecting the allyl carbonate groups contains one or more carbonate groups. These related monomer species can be represented by the graphic formula:

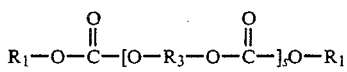

wherein $R_1$ is as defined above with respect to graphic formula I, $R_3$ is a divalent, radical, e.g., alkylene or phenylene, derived from a diol, and s is a whole number from 2 to 5. Diethylene glycol bis(allyl carbonate), the related monomer species can be represented by the graphic formula,

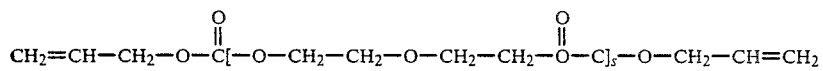

wherein s is a whole number from 2 to 5. The polyol (allyl carbonate) monomer can typically contain from 2 to 20 weight percent of the related monomer species and such related monomer species can be present as mixtures, i.e., mixtures of the species represented by s being equal to 2, 3, 4 etc.

As used in the present description and claims, the term polyol(allyl carbonate) monomer or like names, e.g., diethylene glycol bis(allyl carbonate), are intended to means and include the named monomer and any related monomer species contained therein.

Organic solvents useful in carrying out the solution polymerization described herein are those which are non-reactive chemically with the monomer and resulting homopolymer, having a boiling temperature substantially below the monomer, i.e., a higher vapor pressure, so as to be easily separated from the monomer by distillation, and which serve as a solvent for the polyol(allyl carbonate) monomer and the resulting polymer (and preferably also the initiator). Useful solvents include the halogenated, e.g., chlorinated, $C_1-C_2$ hydrocarbon solvents, i.e., methyl chloride, methylene chloride, ethyl chloride, ethylene dichloride, 1,1,2-trichloro-1,2,2-trifluoroethane, and mixtures thereof. Methylene chloride is preferred because of its high vapor pressure, low boiling point, ease of separation, and relatively low toxicity.

The amount of solvent used in the partial polymerization process should be sufficient to solubilize all of the monomer and to maintain all of the resulting polymer is solution. This is generally from about 0.5 to 5 milliliters of solvent per gram of monomer. Greater amounts of solvent can be used without deleterious effect. Lesser amounts of solvent result in the formation of an insoluble, infusible intractable gel.

The concentration of initiator useful for the partial polymerization should be sufficient to result in the desired degree of allylic utilization at the conditions used, and generally can vary from 0.1 to about 1.5 weight percent initiator, basis weight of monomer. Greater amounts of initiator may result in either residual initiator in the liquid polymer or formation of an infusible, insoluble, intractable gel. The initiators useful in carrying out the solution polymerization of the polyol(allyl carbonate) monomer and the subsequent polymerization of the liquid polymer or modified liquid polymer are free radical initiators, e.g., organic peroxides, and are well known in the art. The preferred free radical initiators are organic peroxy compounds, such as peroxyesters, diacyl peroxides, peroxydicarbonates and mixtures of such peroxy compounds.

Examples of peroxy compounds include: peroxydicarbonate esters such as di(n-propyl)-, diisopropyl-, di(n-butyl)-, di(secondary butyl)-, diisobutyl-, di(2-ethylhexyl)-, dicetyl-, dicyclohexyl- and di(4-tertiarybutyl cyclohexyl)peroxydicarbonate; diacyl peroxides such as diacetyl-, dibenzoyl-, dilauroyl-, and diisobutyl peroxide; and peroxyesters such as tertiarybutyl peroxypivalate, tertiarybutyl peroctoate and tertiarybutyl perneodecanoate.

The solution polymerization is generally carried out at temperatures of from about 28° C. to about 100° C., for from about 1 to about 24 hours. The time and temperature depend on the initiator and the concentration thereof, and the solvent:monomer ratio used. For the polymerization of diethylene glycol bis(allyl carbonate) in methylene chloride at a solvent:monomer ratio of 1:1 v/w, with 0.1 to 1.0 weight percent diisopropyl peroxydicarbonate, basis weight of diethylene glycol bis(allyl carbonate), the time required to obtain the high viscosity, syrupy polymer herein contemplated is from about 6 to about 18 hours at 60° C.

According to a particular exemplification, a mono- or polyfunctional acrylate is added to the liquid polymer. The acrylate additive increases the cure rate, that is, it allows use of a reduced time cure cycle.

The amount of acrylate additive present in the liquid polymer should be sufficient to effect an increase in the cure rate of the liquid polymer or a decrease in the viscosity of the liquid polymer to permit easy handling of the liquid polymer, e.g., such as to facilitate filtering of the liquid polymer. Typically, at least about 5 weight percent of the acrylate additive, basis weight of the polyol(allyl carbonate), is added to the liquid polymer, e.g., from 5 to 20 or 5 to 10 weight percent. However, the amount of the acrylate component added to the liquid polymer should also be low enough so that the properties of the polymerized solid article, e.g., the optical and physical properties thereof such as refractive index and abrasion resistance, are substantially the same as those of a polymerizate prepared from the liquid polymer along, i.e., without the acrylate additive.

The acrylate additive can be added to the composition of solution polymerized polyol(allyl carbonate), i.e., liquid polymer and solvent before the solvent is removed. Alternatively, the acrylate additive can be added to the liquid polymer, i.e., after removal of the solvent.

The polyfunctional acrylate monomers useful as the acrylate additive, especially when present at the 5 to 20, preferably 5-10, weight percent level, basis liquid polymer, are represented by the graphic formula:

$$R_5(OCR_4)_i \quad \text{IX}$$
$$\text{(where the O above CR}_4\text{ is doubly bonded)}$$

which is the reaction product of the polyol, $R_5(OH)_i$, and an alpha-beta unsaturated carboxylic acid,

$$R_4COH \quad \text{X}$$

wherein $R_4$ is the acrylic acid moiety, $$CH_2=C- \atop R'$$

wherein R' is hydrogen or a $C_1$-$C_4$ alkyl group; $R_5$ is the organic residue of the aliphatic polyol, which typically contains from 2 to 12, more typically 2 to 6, carbon atoms, and i is a whole number from 2 to 5, more usually 2 to 3. Preferably, the polyfunctional acrylate monomers are the di- or the triacrylates, more preferably the diacrylates.

Typically, $R_4$ is an acrylic acid moiety chosen from the group consisting of acrylic acid,

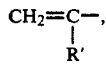

$$CH_2=CHCOH,$$

methacrylic acid,

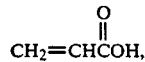

$$CH_2=C-C-OH \atop CH_3$$

and ethylacrylic acid,

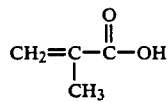

$$CH_2=C-COH \atop CH_2 \atop CH_3$$

$R_5(OH)_i$ can be a diol, a triol, a tetracarbinol, or a pentacarbinol. Most commonly $R_5(OH)_i$ is a diol or triol. Typical diols useful in providing esters with terminal diacrylate functionality include: alpha, omega-glycols such as ethylene glycol, trimethylene glycol, 1,4-butanediol, 1,5-pentane diol and 1,6-hexanediol, other 1,2-glycols, such as propylene glycol, the hydrated ethylene oxide and propylene oxide condensation products, such as diethylene glycol, triethylene glycol, tetraethylene glycol, dipropylene glycol, tripropylene glycol, tetrapropylene glycol, and the like.

Examples of diacrylates include ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, trimethylene glycol diacrylate, trimethylene glycol dimethacrylate, butanediol diacrylate, butanediol dimethacrylate, pentanediol diacrylate, pentanediol dimethacrylate, hexanediol diacrylate, hexanediol dimethacrylate, propylene glycol diacrylate, propylene glycol dimethacrylate, dipropylene glycol diacrylate, dipropylene glycol dimethacrylate, tripropylene glycol diacrylate, tripropylene glycol dimethacrylate, tetrapropylene glycol diacrylate, tetrapropylene glycol dimethacrylate, and the like.

Suitable triacrylates include trimethylolpropane triacrylate, trimethylolpropane trimethacrylate, glycerol triacrylate, glycerol trimethacrylate, pentaerythritol triacrylate, and pentaerythritol trimethacrylate. Suitable tetraacrylates include pentaerythritol tetraacrylate and pentaerythritol tetramethacrylate.

Difunctional acrylate monomers, i.e., diacrylates and dimethacrylates, are the preferred polyfunctional acrylate monomers. Preferred are the diacrylates and dimethacrylates of aliphatic diols. Especially preferred aliphatic diol diacrylates and dimethacrylates are those having from about 4 to about 15 atoms, i.e., carbon atoms or carbon and oxygen atoms, between the carbonyl carbon atoms. Examples of such diacrylates and dimethacrylates are those represented by the graphic formulae:

$$R_4CO-(CH_2CH_2O)_p-CR_4 \quad \text{XI}$$

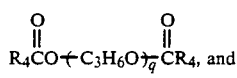

$$R_4CO-(C_3H_6O)_q-CR_4, \text{ and} \quad \text{XII}$$

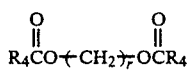

$$R_4CO-(CH_2)_r-OCR_4 \quad \text{XIII}$$

where p is a whole number from 1 to 4, q is a whole number from 1 to 4 when ($C_3H_6O$) is

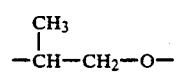

$$-CH-CH_2-O- \atop CH_3$$

and a whole number from 1 to 3 when ($C_3H_6O$) is $-CH_2CH_2CH_2O-$; and r is a whole number from 1 to 13.

Monofunctional acrylates that can be used in the present invention are typically chosen from the group consisting of $C_1$ to $C_4$, preferably $C_1$-$C_2$, alkyl and $C_5$-$C_6$cycloalkyl, preferably cyclohexyl, esters of the acrylic type acid of graphic formula X, most notably, acrylic acid, methacrylic acid and 2-methylenebutyric acid. The monofunctional acrylates can be present in amounts of from 5 to 20, e.g., 5 to 10, weight percent, basis the liquid polymer. Examples of monofunctional acrylates include: methyl acrylate, methyl methacrylate, ethyl methacrylate, butyl methacrylate, isobutyl methacrylate, and cyclohexyl methacrylate. The methacrylic acid esters, e.g., methyl methacrylate, are preferred.

The monofunctional monomer that can be used in the present invention is typically chosen from the group consisting of $C_1$-$C_4$ alkyl esters of unsaturated dicarboxylic acids, vinyl esters of $C_1$ to $C_3$ saturated monocarboxylic acids and styrene. The monofunctional monomer can be present in amounts of from 5 to 20, e.g., 5 to 10, weight percent, basis the liquid polymer. Examples of such monomers include: $C_1$-$C_2$ alkyl esters of unsaturated $C_4$-$C_6$ dicarboxylic acids. As the unsaturated dicarboxylic acid, there can be mentioned maleic, fumaric, itaconic, citraconic, ethylmaleic and mesaconic acids. Alcohols used to prepare the esters of the mono- and dicarboxylic acids include $C_1$-$C_4$ alkanols, e.g., methanol, ethanol, propanol, isopropanol, the butanols cyclopentanol and cyclohexanol.

Vinyl esters of lower members of saturated monocarboxylic acids can also be used as the unsaturated monofunctional monomer. In particular, there are contemplated the vinyl esters of $C_1$-$C_3$ saturated monocarboxylic acids, e.g., formic, acetic and propionic acids, such as vinyl acetate.

Examples of unsaturated monofunctional monomers contemplated herein include: dimethyl maleate, diethyl maleate, methyl ethyl maleate, dimethyl fumarate, diethyl fumarate, methyl ethyl fumarate, vinyl acetate, vinyl formate, vinyl propionate, styrene etc. Dimethyl maleate and dimethyl fumarate are preferred.

Various additives can be present also in the polymerizable liquid composition, e.g., colorants, dyes, photochromic agents, and thermochromic agents, among others.

The liquid polymer and modified liquid polymer compositions of the present invention can be polymerized (cured) by the conventionally known techniques for polymerizing allyl glycol carbonate-containing compositions. Typically, an organic peroxide useful for initiating the polymerization of polyol(allyl carbonate) monomers is added to the composition and heat applied. The organic peroxide can be the same as or different from the initiator used to prepare the liquid polymer and is typically used in amounts of from about 2.25 to 3.5 parts of initiator per 100 parts of monomer. The polymerization temperature can be from about 28° C. to about 100° C. Articles prepared from the polymerizable liquid polymer or modified liquid polymer (to which organic peroxide has been added) composition can vary depending on the final end use. For example, the composition can be poured onto a flat surface and heated, whereby to effect polymerization and form a flat sheet or coating. According to a still further exemplification, the polymerizable composition is placed in molds, e.g., glass molds, and the molds heated to effect polymerization, thereby forming shaped articles such as lens blanks or ophthalmic lenses.

According to one exemplification of this invention, a liquid mixture comprising 100 grams of diethylene glycol bis(allyl carbonate), 0.5 to 1.0 grams of diisopropyl peroxydicarbonate, and 100 milliliters of methylene chloride are placed in a stoppered bottle. The bottle is purged with nitrogen and the liquid mixture held at 60° C. for a period of from about 8 to 16 hours.

The methylene chloride solvent is then removed from the resulting liquid polymer by distillation, leaving behind a viscous, syrupy liquid. The liquid can be mixed with from about 10 to 20 weight percent of an active monomer, e.g., tripropylene glycol diacrylate, and peroxide initiator and the mixture applied to a solid surface by any of several conventional means, e.g., spraying, roll coating, spin coating, etc., and cured to form a solid coating thereon.

The present invention is more particularly described in the following examples which are intended as illustrative only since numerous modifications and variations therein will be apparent to those skilled in the art.

In the example, polymerization products are tested for different properties by the physical test methods described hereinafter.

1. Density—Bulk densities were determined in 1 ml pycnometers thermostated in a water bath at 25° C. and calibrated with freshly boiled distilled water.

2. Viscosity—Absolute viscosity determinations were accomplished on materials in a thermostated water bath of 25° C. with a Brookfield Model LVF viscometer. Choice of spindle and rotational speed were made to obtain mid-range readings. Readings were taken for at least two speeds and averaged to the nearest five centipoise (cps) for values greater than 100 centipoises.

3. Kinematic Viscosity—Determined on materials in a thermostated water bath of 25° C. with a Canon-Fenske capillary viscometer.

4. Yellowness Index—Color was determined spectrophotometrically using a Hunterlab D25P-2 Sphere Haze and Color Difference meter with Yellowness Index option and the yellowness index determined in accordance with ASTM Test Method D1925-70.

5. Light Transmission—The percent light transmission was measured using a Hunterlab Colorimeter, model D25P-2.

6. Haze—the percent haze was measured using a Hunterlab Colorimeter, Model D25P-2.

7. Barcol Hardness—This property was measured in accordance with ASTM Test Method D2583-81 using a Barcol Impresser.

8. Bayer Abrasion—This property was measured using a test method similar to ASTM method F735-81. The method used the following conditions: Speed—150±3 cycles/min; stroke length—4 inches; 6/14 Quartz sand weight—1000±10 grams (Sand was changed after 300 accumulated cycles). The % haze was measured at 0, 50, 150, 300 and 600 cycle increments using a Hunterlab D25P-2 Colorimeter. Results are reported relative to a Plexiglass ® Thermoplastic polymer standard as a multiple of the cycle interval which produced a change of 10% haze in the Plexiglass sheet.

EXAMPLE 1

A liquid mixture containing 200 grams of diethylene glycol bis(allyl carbonate) (CR-39 ® Allyl Diglycol Carbonate), 200 ml of methylene chloride and 0.93 milliliters of diisopropyl peroxydicarbonate was prepared. The liquid mixture was placed in a bottle, and the bottle purged with argon for 3 minutes. The bottle (and the liquid mixture therein) was then held at 60° C. for 18 hours. The bottle and its liquid content were then cooled to 25° C., and the liquid content placed in 1,000 milliliter round bottom flask. The liquid in the flask was vacuum stripped at 50° C. for 2 hours. Then the temperature was raised to 60° C. for 1 hour and the pressure lowered until a vacuum of 2 mm Hg was obtained.

The residue (liquid polymer) remaining in the flask after vacuum stripping was a viscous liquid having a viscosity of 7,302 centistokes, a density of 1.199 grams per cubic centimeter and an allyl utilization of 37.3 percent, as determined by NMR spectroscopy.

EXAMPLES 2-4

The procedure of Example 1 was repeated except for changes in the reaction temperature, solvent:monomer ratio, and initiator concentration. The data obtained is tabulated in Table I.

TABLE I

| | Starting Materials | | | | Liquid Polymers | |
|---|---|---|---|---|---|---|
| | CR-39 ® | Methylene | | | | |
| Example No. | Monomer (grams) | Chloride (ml) | IPP (ml) | Reaction Temp. (°C.) | Allyl Utiliz. (%) | Viscosity (cps) |
| 2 | 100 | 200 | 1.0 | 60 | 41.5 | 32,500 |
| 3 | 100 | 200 | 1.0 | 70 | 32.5 | 4,000 |
| 4 | 100 | 300 | 1.1 | 70 | 34 | 1,900 |

EXAMPLE 5

A liquid mixture containing 100 grams of diethylene glycol bis(allyl carbonate) monomer (CR-39 ® Allyl Diglycol Carbonate), 200 ml of 1,2-dichloroethane and 1.1 milliliters of diisopropyl peroxydicarbonate was prepared. The liquid mixture was placed in a bottle and the bottle purged with argon for approximately 3 minutes. The bottle (and the liquid mixture) was then held at 70° C. for 16 hours. The bottle plus contents were cooled to 25° C. and the liquid contents placed in a 1,000 milliliter round bottom flask. The liquid in the flask was vacuum stripped at 65° C. for 1 hour at approximately 25 mm Hg. Then the pressure was lowered to 0.5 mm Hg over the next 1 hour.

The residue (liquid polymer) remaining in the flask after vacuum stripping was a viscous liquid having a viscosity of 19,000 centistokes, a density of 1.219, and an allyl utilization of 40.1 percent, as determined by infrared spectroscopy.

EXAMPLE 6

The liquid polymer of Example 1 was combined with 2 parts of diisopropyl peroxydicarbonate per hundred parts of liquid polymer. The liquid polymer-initiator mixture was placed between two glass sheets separated by a ¼ inch (6 millimeter) gasket and heated according to the following cure cycle:

| Time-Temperature Sequence For Cure Cycle | |
|---|---|
| Cumulative Time (hours) | Temperature, °C. |
| 0 | 45 |
| 2 | 47 |
| 4 | 48 |
| 6 | 50 |
| 8 | 52 |
| 10 | 54.5 |
| 12 | 57 |
| 14 | 61 |
| 16 | 69 |
| 17 | 79 |
| 17.6 | 84 |
| 18 | 98 |

The polymerizate prepared from the liquid polymer was found to have 92.1 percent light transmission, 1.5 percent haze, 0.5 yellowness index, a 15 second Barcol hardness of 24, a Bayer Abrasion of 6, and a bulk density of 1.310 grams per cubic centimeter. This bulk density corresponds to approximately 8.5 percent shrinkage.

EXAMPLE 7 (COMPARATIVE)

Diethylene glycol bis(allyl carbonate) monomer was used to prepare 1.5 inch by 1.5 inch by ⅛ inch thick castings with varying amounts of diisopropyl peroxydicarbonate (IPP) initiator. The monomer was polymerized using a 24 hour cure cycle. The temperature during the cure cycle increased from an initial 40° C. to a final temperature of about 100°-105° C. Properties of duplicate castings were determined and are tabulated in Table II.

TABLE II

| Wt. % IPP | Barcol Hardness (15 Second) | Bayer Abrasion (X Plexiglas ®) (No. Cycles) | Haze, % | Light Transmission, % | Yellowness Index |
|---|---|---|---|---|---|
| 2.25 | 0 | 7 | 0.3 | 92.8 | 0.4 |
| 2.25 | 0 | 7 | 0.5 | 92.8 | 0.4 |
| 2.50 | 8 | 4 | 0.3 | 92.6 | 0.4 |
| 2.50 | 8 | 5 | 0.3 | 92.6 | 0.4 |
| 2.75 | 16 | 5 | 0.4 | 92.6 | 0.5 |
| 2.75 | 17 | 6 | 0.4 | 92.6 | 0.5 |
| 3.00 | 20 | 4 | 0.4 | 92.6 | 0.5 |
| 3.00 | 21 | 6 | 0.3 | 92.7 | 0.5 |
| 3.50 | 25 | 5 | 0.3 | 92.6 | 0.5 |
| 3.50 | 26 | 6 | 0.4 | 92.6 | 0.5 |

EXAMPLE 8

A liquid composition was prepared by mixing 100 parts of liquid polymer having a viscosity of 23,000 centistokes and an allyl utilization of 40.1%, 10 parts of methyl methacrylate, 2.3 parts diisopropyl peroxydicarbonate, and 0.45 parts of benzoyl peroxide. Approximately 30 ml of this casting solution were placed in a mold comprised of two 1.25 cm, thick flat glass plates and an 11 mm gasket. The mold plus contents were placed in a water bath at 55° C. The temperature of the bath was increased to 100° C. over a period of 90 minutes. At the end of this cure cycle, a hard plastic disc was removed from the mold. The disc was held at 115° C. for 90 minutes under an argon atmosphere. After cooling to room temperature, the disc was found to have a 15 second Barcol hardness of 20.

The data of Example 8 show that a modified liquid polymer of the present invention can be cured sufficiently in 1½ hours to be removed from a mold, thereby releasing the mold for further use. After additional curing for 1½ hours, the article had a satisfactory Barcol hardness reading.

Although the present processes and articles have been described with reference to specific details of certain embodiments thereof, it is not intended that such details be regarded as limitations on the scope of the invention except as to the extent that they are included in the accompanying claims.

We claim:

1. A process for preparing liquid, gel-free, partially polymerized polyol(allyl carbonate) having from 20 to 50 percent allylic utilization, which process compromises (a) preparing a mixture of polyol(allyl carbonate) monomer and an organic solvent selected from $C_1-C_2$ chlorinated solvents, the ratio of solvent to monomer being from 0.5 to 5 milliliters of solvent per gram of monomer, said polyol(allyl carbonate) monomer being represented by the graphic formula:

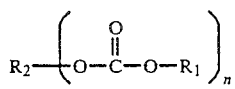

wherein $R_1$ is allyl, $R_2$ is derived from an alkylene glycol of from 2 to 4 carbon atoms, a poly ($C_2-C_4$) alkylene glycol, or isopropylidene bis(paraphenol), and n is 2, (b) polymerizing said monomer with from 0.5 to 1.5 weight percent of peroxydicarbonate ester initiator until from 20 to 50 percent of the allylic carbon-carbon linkages are consumed, and (c) removing said solvent from the product of the polymerization to produce a gel-free, liquid, polymerizable composition.

2. A process for preparing liquid, substantially gel-free, partially polymerized polyol(allyl carbonate) having from 20 to 50 percent allylic utilization, which process comprises (a) preparing a mixture of polyol(allyl carbonate) monomer and an organic solvent in which the monomer and the partially polymerized polyol(allyl carbonate) are soluble, said solvent being non-reactive chemically with said monomer and said partially polymerized polyol(allyl carbonate), and having a higher vapor pressure than said monomer, (b) polymerizing said monomer with free radical initiator until from 20 to 50 percent of the allylic carbon-carbon linkages are consumed, and (c) removing said solvent from the product of the polymerization to produce a gel-free, liquid, polymerizable composition.

3. A process for preparing liquid, substantially gel-free, partially polymerized polyol(allyl carbonate) having from 20 to 50 percent allylic utilization in admixture with cure enhancing additive, which process comprises (a) preparing a mixture of polyol(allyl carbonate) monomer and an organic solvent in which the monomer and the partially polymerized polyol(allyl carbonate) are soluble, said solvent being non-reactive chemically with said monomer and said partially polymerized polyol(allyl carbonate), and having a higher vapor pressure than said monomer, (b) polymerizing said monomer with free radical initiator until from 20 to 50 percent of the allylic carbon-carbon linkages are consumed, (c) to the resulting composition, adding from 5 to 30 weight percent, basis the partially polymerized monomer, of acrylate cure enhancing additive selected from the group consisting of (1) monofunctional acrylate monomer, (2) polyfunctional acrylate monomer, and (3) mixtures thereof, and (d) removing said solvent from said further composition to produce a gel-free, liquid, polymerizable composition.

4. The process of claim 1 wherein the peroxydicarbonate ester is selected from di-n-propyl peroxydicarbonate, diisopropyl peroxydicarbonate, disecondary butyl peroxydicarbonate, di(2-ethylhexyl) peroxydicarbonate, dicetylperoxydicarbonate, dicyclohexyl peroxydicarbonate, di(4-tertiarybutyl cyclohexyl) peroxydicarbonate and mixtures thereof.

5. The process of claim 4 wherein the polyol(allyl carbonate) is diethylene glycol bis(allyl carbonate).

6. The process of claim 2 wherein the polyol(allyl carbonate) monomer is represented by the graphic formula:

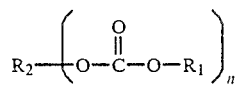

wherein $R_1$ is an allyl radical represented by the graphic formula

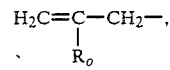

wherein $R_0$ is hydrogen, chlorine, bromine, or a $C_1-C_4$ alkyl, $R_2$ is a polyvalent radical derived from an aliphatic or aromatic polyol containing from 2 to 5 hydroxy groups, and n is a whole integer from 2 to 5.

7. The process of claim 2 wherein the organic solvent is a halogenated $C_1-C_2$ hydrocarbon.

8. The process of claim 2 wherein the ratio of organic solvent to monomer in said mixture is from about 0.5 to 5 milliliters of solvent to one gram of monomer.

9. The process of claim 8 wherein the solvent is selected from the group consisting of methyl chloride, methylene chloride, ethyl chloride, ethylene dichloride, 1,1,2-trichloro-1,2,2-trifluoroethane and mixtures of such solvents.

10. The process of claim 8 wherein said free radical initiator is organic peroxide initiator.

11. The process of claim 10 wherein the organic peroxide initiator is a peroxydicarbonate ester.

12. The process of claim 2 wherein the polyol(allyl carbonate) monomer is diethylene glycol bis(allyl carbonate), the organic solvent is a chlorinated $C_1-C_2$ hydrocarbon, the free-radical initiator is used in amounts of from 0.1 to 1.5 weight percent, based on the monomer, and the polymerization temperature is from 28° C. to 100° C.

* * * * *